Fig. 1.

Inventors
Harold G. Johnstone
Charles W. Robbins
by [signature] Att'y.

April 29, 1941.　　H. G. JOHNSTONE ET AL　　2,239,892
COMPUTING SYSTEM
Filed Oct. 24, 1928　　3 Sheets-Sheet 3

Inventors
Harold G. Johnstone
Charles W. Robbins
by H. A. Pattern, Att'y.

Patented Apr. 29, 1941

2,239,892

UNITED STATES PATENT OFFICE 2,239,892

COMPUTING SYSTEM

Harold Glenn Johnstone, Oak Park, and Charles William Robbins, La Grange, Ill., assignors to Western Electric Company, Incorporated, New York, N. Y., a corporation of New York Application October 24, 1928, Serial No. 314,578

46 Claims. (Cl. 235—61)

This invention relates to computing systems, and more particularly to an electrical impulse system for automatically accomplishing mathematical multiplication and addition and indicating the results thereof.

The primary object of the invention is to provide an efficient, comparatively simple and flexible system for rapidly performing mathematical computations and indicating the results thereof.

In order to attain this and other objects, and in accordance with the general features of the invention, one embodiment thereof includes a multiplying commutator for each digit having a multiplication table of nine rotatable contact disks representing the products of one particular digit by itself and each of the other digits. The multiplicand and multiplier are set up on a denominational keyboard by depressing keys which establish electrical circuits, whereby, beginning with the denominational column of lowest order, electrical energy is supplied for each digit in the multiplier, one at a time, through the contacts on the disks, the multiplicand and a distributing switch to a register.

The multiplying commutators for the digits in the multiplier are rotated one at a time to accomplish the multiplication. Each disk on a commutator is provided with a predetermined number of radial contacts and an associated brush so that during the first half revolution of the disk the units part of the product will be indicated by transmitting electrical impulses corresponding in number to the digit to be registered, and during the second half revolution the tens part of the product is likewise indicated. The distributing switch advances the electrical connections from units to tens, tens to hundreds, hundred to ten hundreds, etc., at the proper time in each cycle to direct the impulses to the proper denominational registers where the products are accumulated. Mathematical addition is accomplished by rendering the advancing means for the distributing switch inactive and depressing only the multiplicand keys whereby the multiplying commutator for the digit 1 establishes impulses which cause the actuation of the proper denominational registers to accumulate the numbers as they are successively set up on the multiplicand keybank.

Other novel features and advantages of the invention will become apparent in the following detailed description, reference being had to the accompanying drawings, wherein.

In the drawings and throughout the specification, like reference numerals are employed to designate similar parts.

Referring now to the drawings, the numeral 100 (Fig. 8) designates a keyboard including multiplicand and multiplier keybanks 101 and 102, respectively, arranged in denominational strips or columns of nine keys 103, each strip of keys representing the digits 1 to 9, inclusive. The keys 103 are of a locking type whereby any key in the strip upon being depressed locks down mechanically and is released upon the depression of any other key in that particular strip. For the purpose of restoring the actuated keys to normal, a plurality of electromagnets 104 (Fig. 1) operatively connected to the key strips have their operating windings connected to a suitable control circuit, which, when closed, causes their energization and thereby the restoration of the depressed keys to normal. Inasmuch as the details of the key construction do not constitute a part of this invention, a detailed description thereof will not be given, but such a description may be had by referring to A. D. Hargan Patent No. 1,378,950, issued May 24, 1921.

To set up a problem of multiplication, the product of which is desired, keys corresponding to the digits in the multiplicand and multiplier are depressed in the keyboard 100 to establish certain electrical circuits. These circuits extend through a plurality of multiplying commutators 108 (Fig. 2), one for each digit, 1 to 9, inclusive, to send electrical impulses to a distributing switch designated generally as 109 which directs the impulses into the proper denominational columns of a register 110 for accumulating and indicating the result.

Figures 4, 5, 6, 7, 8:
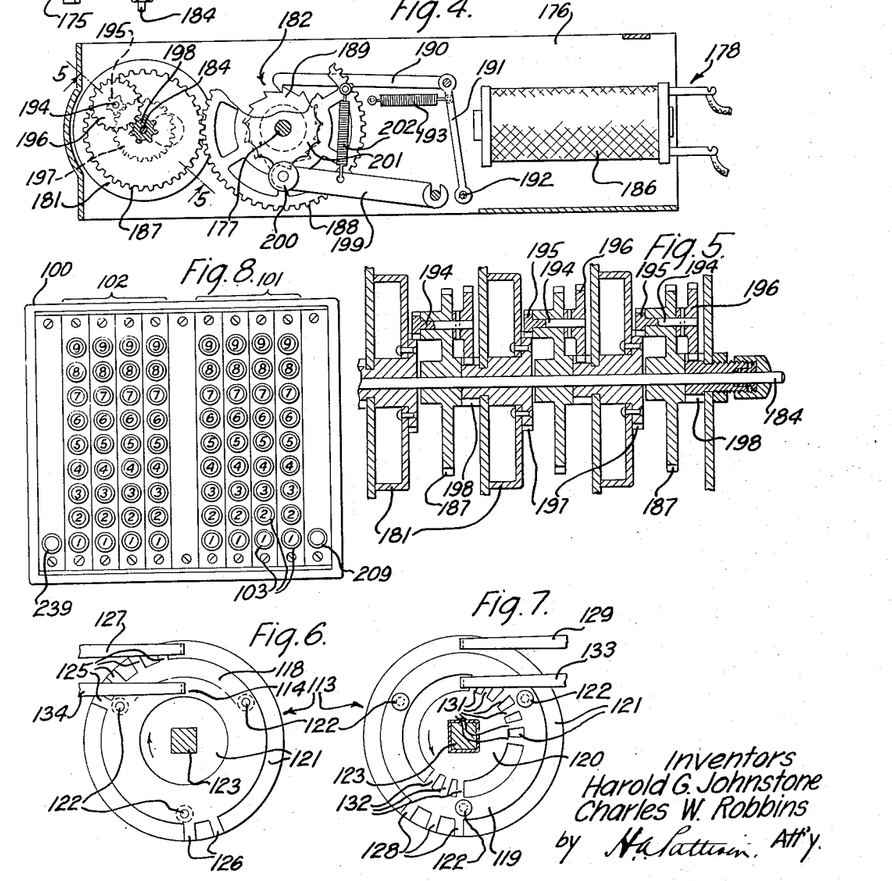
Fig. 4 is a sectional view thereof taken on line 4—4 of Fig. 3.
Fig. 5 is an enlarged sectional view taken on line 5—5 of Fig. 4.
Figs. 6 and 7 are enlarged sectional views taken on lines 6—6 and 7—7, respectively, of Fig. 2, showing one of the disk-units of the multiplying commutator for the digit six.
Fig. 8 is an elevational plan view of the keyboard showing the multiplicand and multiplier keybanks.

Each of the digital multiplying commutators 108 comprises an electrical multiplication table in which there are nine electrical contact disks divided into three units of three each designated by the numeral 113. Each of the units 113 of three contact disks is provided with an associated disk 114 (Fig. 6) which is connected to ground. The contact disks have individual brushes and are so constructed that a radial contact or a sequence of radial contacts on one portion of the circumference represents the units part of a particular product of two digits and contacts on another portion the tens part. Figs. 6 and 7 show one of the units 113 of three disks 118, 119 and 120, representing the products of the digit 6 multiplied by 4, 5 and 6, respectively, associated with the disk 114. The four copper disks 114, 118, 119 and 120 are mounted on an insulator 121 and are electrically interconnected due to the fact that the disks 119 and 120 are integral and attached to integral disks 114—118 by means of copper rivets 122 passing through the insulator 121 and serving to hold the elements together as the unit 113. The insulator is keyed to a shaft 123 and insulates the copper disks therefrom.

Figure 1:
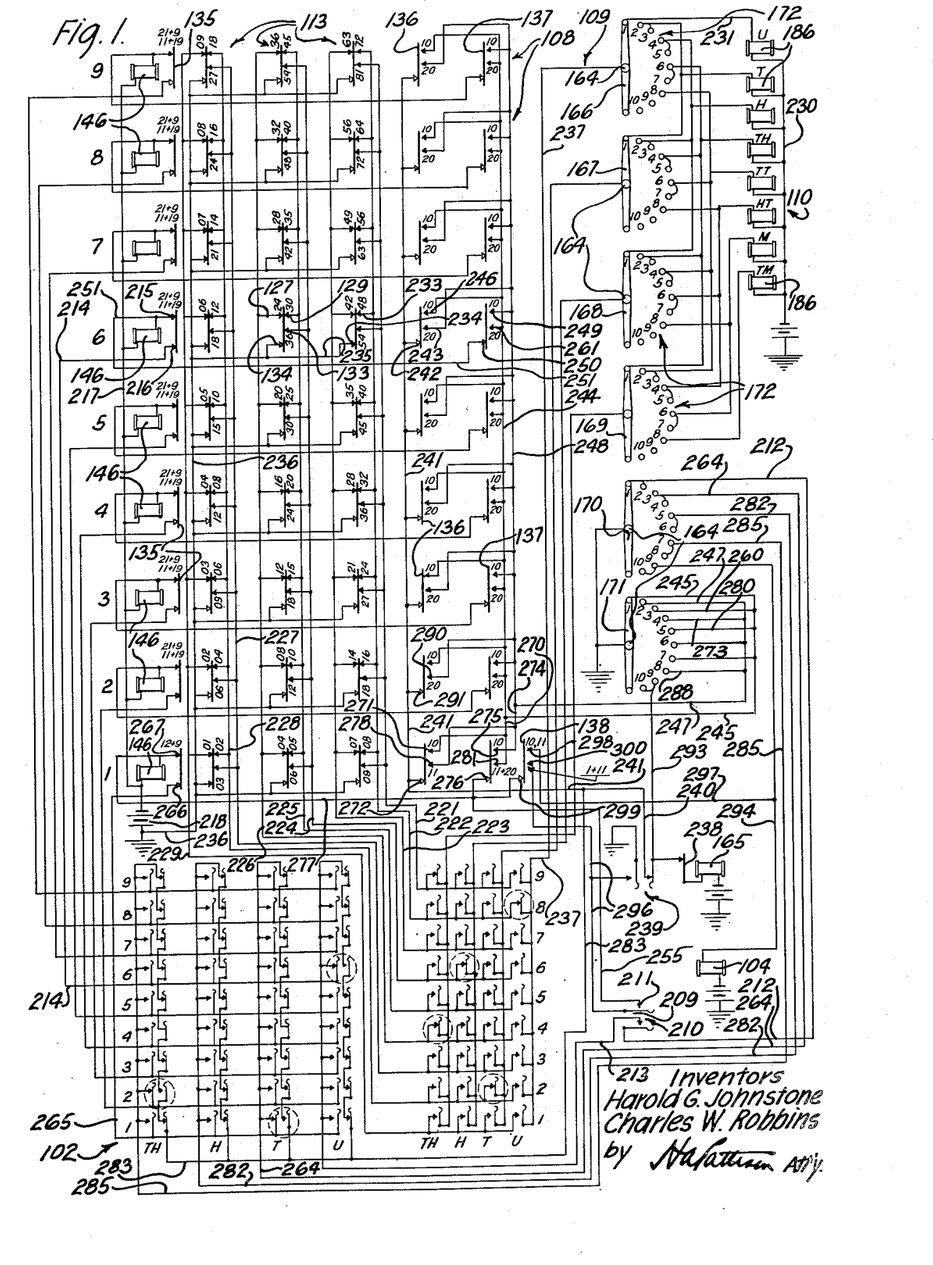
Fig. 1 is a circuit diagram disclosing an electrical computing system for performing a mathematical multiplication or addition and indicating the results thereof.

Disk 118 as illustrated has a series of four radial contacts 125 on one portion of its circumference representing the units part of the product 24 of 6×4 and on another portion a series of two radial contacts 126 representing the tens part of the same product to be engaged by a brush 127. The disk 119 has only three radial contacts 128 representing the tens part of the product 30 of 6×5 to be engaged by a brush 129 since the units part is zero and no radial contacts are required therefor as the register 110 is so designed that no actuation is effected for a zero. The disk 120 has six radial contacts 131 representing the units part of the product 36 of 6×6 and another set of three contacts 132 representing the tens part thereof to be engaged by a brush 133. A brush 134 connected to ground contacts at all times with the disk 114 which is shown in Fig. 6 as being integral with the disk 118. The brushes 127, 129 and 133 as illustrated in Fig. 1 are connected by conductors to contacts in the multiplicand keybank 101. The above described unit was selected for purposes of illustration and it will be understood that the other units are of a similar construction and are analogous to sequence switches used in telephonic communicating systems.

The contact disks as shown in Fig. 1 are arranged in the usual multiplication table order of 1×1, 1×2, 1×3, 1×4, 1×5, 1×6, 1×7, 1×8, 1×9, 2×1, 2×2, 2×3, 2×4, etc., and are provided with radial contacts corresponding in number to the value of the digits of the particular products.

Each of the three units 113 of three contact disks are mounted on the shafts 123 of the digital multiplying commutators 108. Carried on each of the shafts 123 are control disks 135, 136 and 137 for closing and opening various circuits at predetermined intervals throughout the multiplying cycle. The control disks 135 for the digital multiplying commutators 2 to 9, inclusive, are divided into twenty-one radial positions and constructed to make contact with their upper brushes at all positions except positions 10 and 20. Control disk 135 for the digit 1 multiplying commutator is constructed to make contact at all points except positions 10 and 11. The control disks 136 and 137 are likewise divided into twenty-one radial positions and for the digital multiplying commutators 2 to 9, inclusive, they make contact with their upper right hand brushes only at position 10; and their right hand lower brushes contact only at position 20. Likewise, the control disks 136 and 137 for the digit 1 multiplying commutator make contact with their upper right hand brushes only at position 10, and the lower right hand brush of the disk 136 contacts only at position 11, whereas the lower right hand brush of the disk 137 contacts at positions 11 to 20, inclusive. The digit 1 multiplying commutator also has an additional control disk 138 for addition purposes whose upper right hand brush contacts at positions 10 and 11 and whose lower right hand brush contacts at positions 1 to 11, inclusive.

The rotative positions at which the contacts on the control disks 135, 136, 137 and 138 are closed are indicated on the drawings by a numeral or numerals; for example, in Fig. 1 the numerals 21+9 and 11+19 over the upper contact of control disk 135 of the digit 9 multiplying commutator represents that at rotative positions 21, 1, 2, 3, 4, 5, 6, 7, 8 and 9 and positions 11, 12, 13, 14, 15, 16, 17, 18 and 19, this particular contact is closed so that it is open only at positions 10 and 20. Likewise, the numerals 12+9 over the upper contact of control disk 135 for the digit 1 multiplying commutator indicates that the contact is closed at rotative positions 12, 13, 14, 15, 16, 17, 18, 19, 20, 21, 1, 2, 3, 4, 5, 6, 7, 8 and 9 and open only at rotative positions 10—11.

Friction disks 145 are secured to leaf springs 144 which in turn are fastened to the shafts 123. The flexible connections between the friction disks 145 and the shafts 123 permits the disks 145 to be attracted by electromagnets 146 into frictional engagement with continuously rotating power disks 147 fastened to driven shafts 148. These shafts are suitably journaled in bearings 149 secured to a frame 150 and are equipped at their lower extremities with bevel gears 151 which mesh with similar gears 152 carried by a continuously rotating shaft 153 supported in journals 154 also attached to the frame 150. The shaft 153 in turn is driven by a worm wheel 155 keyed thereto and meshing with a worm drive 156 of an electric motor 157. From the foregoing description it will be readily understood that upon energization of an electromagnet 146 the particular digital multiplying commutator 108 associated therewith will be rotated.

Attached to each multiplying commutator shaft 123 and rotatable therewith is a dial 160 divided into twenty-one positions. A stationary pointer 161 associated with each dial indicates the position of the contact disks representing the multiplication table of a particular digit at any instant. The positions 1 to 21 are adopted to more clearly describe the sequence of events as the multiplying commutators 108 are rotated, one at a time through one complete revolution. It is to be noted that the units part of a product of two digits is registered during the first part of the cycle, positions 1 to 10, inclusive, and during the second part of the cycle, positions 11 to 20, the tens part is registered. Position 21 is the normal position in which the multiplying commutator stands when not in use.

The distributor switch 109 is provided for transferring the electrical connections from units to tens, tens to hundreds, hundreds to ten hundreds, etc., as the multiplication progresses to complete an electrical circuit to the proper denominational electromagnets in register 110. The distributing switch 109 is similar in design to selector switches used in telephonic systems and comprises in general a shaft 164, an electromagnet 165 for rotating it one step at a time, six brushes 166 to 171, inclusive, insulatively mounted upon the shaft, and arcuate banks 172 of eleven stationary contacts adapted for cooperation with said brushes. Four of the brushes 166 to 169, inclusive, designate and are connected by conductors to the units (U), tens (T), hundreds (H), ten hundreds (TH) columns in the multiplicand keybank 101, respectively. As the multiplication progresses, the fifth brush 170 connects ground progressively to the columns indicating units (U), tens (T), hundreds (H), ten hundreds (TH) in the multiplier keybank 102 to close a circuit therefrom through electromagnets 146 to a source of electrical energy to effect rotation of the digital multiplying commutators 108 as controlled by the depression of the keys in the multiplier keybank 102. The sixth brush 171 is adapted to complete an energizing circuit through control disk 137 to an electromagnet 146 at predetermined intervals to cause actuation of the particular digital multiplying commutator 108 associated therewith by attracting the friction disk 145 into engagement with the rotating disk 147.

Figure 2:
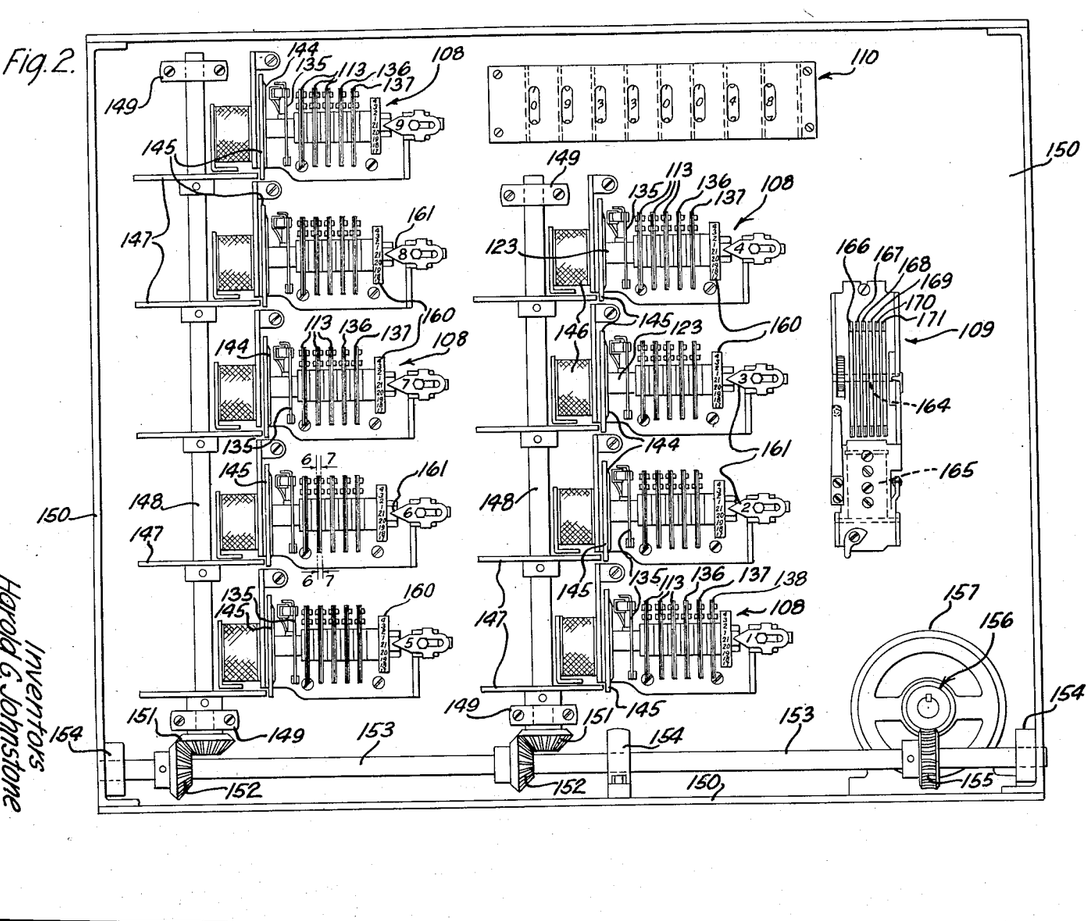
Fig. 2 is a front elevational view of the computing and indicating mechanisms.
Figure 3:
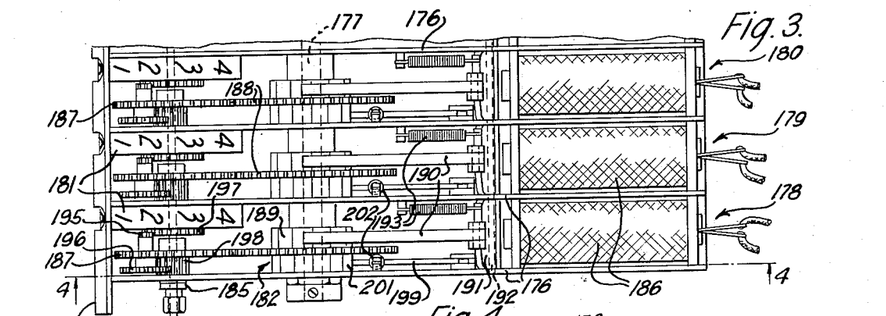
Fig. 3 is a fragmentary plan view of the indicating or registering mechanism.

The register 110 (Figs. 2 to 5, inclusive) comprises a plurality of electromagnetically controlled registering sections, one for each denominational column. The operating mechanism of the register is enclosed within a housing comprising a face plate 175 and a plurality of spaced vertical side plates 176 having apertures for accommodating a shaft 177. The register 110 comprises a plurality of readily separable independent sections which are operatively interconnected to a train of planetary gears in the manner hereinafter described. Three of these denominational registering sections are shown in Fig. 3 and are hereinafter referred to as units (U), registering section 178, tens (T), registering section 179, and hundreds (H), registering section 180. By referring to Fig. 3, it will be noted that the registering sections 178, 179 and 180 are similarly constructed. For this reason like reference numerals have been employed to designate similar parts of the individual sections and it is believed that the following detailed description of one of the registering sections is sufficient to a complete understanding of the invention.

Each registering section comprises a registering element or indicator 181 individually actuated by suitable gearing from the shaft 177; its actuation being controlled by a suitable ratchet and pawl mechanism 182 operated by an electromagnet 186 controlled by electrical impulses received from the multiplying commutators 108. As best shown in Fig. 5, the indicators 181 are rotatably carried upon a horizontal shaft 184 which extends through suitable apertures provided therefor in the vertical side plates 176 and is secured to the end vertical side plates as indicated at 185.

Associated with each of the indicators 181 is a carrying device comprising a train of interconnected planetary gears constructed and arranged so that the actuation or rotation of any of the indicators causes a simultaneous rotation of the adjacent indicator of higher denomination in the ratio of 1 to 10. For example, while the units (U) indicator makes one-tenth, the tens (T) indicator makes one one-hundredth of a revolution, the hundreds (H) indicator makes one one-thousandth of a revolution, etc. It should be understood also that the indicators may be individually actuated directly from their ratchet and pawl mechanisms simultaneously with their actuation by the carrying devices. A gear 187 associated with each of the indicators 181 is rotatably mounted upon the shaft 184 and meshes with a gear 188 secured to or formed integral with a ratchet 189 rotatably supported on the shaft 177. The ratchet is adapted to be engaged by a pawl 190 pivoted at the upper extremity of an armature 191 which in turn is pivoted at 192 to one of the vertical side plates 176.

Upon the energization of the relay 186 its armature 191 is moved to the right (Fig. 4) against the action of a spring 193, thereby causing the pawl 190 to engage the ratchet and move the ratchet and its associated gear 188 one step in clockwise rotation. Each gear 187 carries an eccentrically disposed rotatable pin or stud shaft 194, and gears 195 and 196 are secured to this stud shaft on opposite sides of the gear 187. The gear 195 meshes with a gear 197 mounted upon the shaft 184 so as to be rotatable with the associated indicator 181 and the gear 196 meshes with a gear 198 mounted upon the shaft 184 so as to be rotatable with the adjacent indicator 181 of lower denomination. The arrangement is such that the indicators are actuated simultaneously with the actuation of indicators of lower denomination in ratios of one to ten, one to one hundred, one to one thousand, etc.

A suitable centering stop is provided for each of the indicators, which, in the present embodiment of the invention, comprises a lever 199 pivoted at one end to the side plate 176 (Fig. 4). A roller 200 carried upon the free end of the lever 199 engages a notched disk 201 secured to or formed integral with the gear 188. The roller 200 is held in yielding engagement with the notched disk 201 by a tension spring 202 secured at one end to the lever 199 and attached at its opposite end to the side plate 176.

To facilitate an explanation of the operation of the computing system, a problem of multiplying 4,628 by 2,016 is assumed and a detailed description will now be given of how the system operates to obtain the product. The motor 157 is connected to a source of electrical power (not shown) and the friction disks 147 driven continuously as has been previously explained. The multiplicand, 4,628, and the multiplier, 2,016, are set up on the keybanks 101 and 102 (Fig. 8) by depressing the corresponding digital keys in the proper denominational columns indicated by the circles in Fig. 1. A start key 209 (Fig. 8) of the locking type having an electromagnetically operated release and comprising contacts 210 and 211 (Fig. 1) is depressed to apply current to the following circuit: from ground to brush 170 of distributor switch 109, through stationary terminal 1 of the associated arcuate bank of terminals 172, conductor 212, contact 210, through conductor 213 to the units (U) column in the multiplier keybank 102. Key 6 being depressed in the units (U) column in the multiplier keybank 102, the circuit is continued on through the left hand contact of said key through conductor 214, lower brush 216 of the associated control disk 135 of the multiplying commutator 108 representing the digit 6 through said control disk 135, upper brush 215 thereof, through the windings of the electromagnet 146 for the digit 6, conductor 217 to battery 218 and thence to ground. The energization of the electromagnet 146 causes the attraction of the particular friction disk 145 into engagement with one of the disks 147 to effect rotation of the multiplying commutator for the digit 6 as previously described. Thus, the multiplying commutator is rotated and upon its passing rotative position 21, each of the contact disks thereof through their accompanying brushes make and break contact a number of times equal to the units part of the product represented by each disk until rotative position 10 is reached, when the rotation is stopped due to the fact that a conducting portion is missing at that point in the control disk 135 and the source of current is disconnected to permit the friction disk 145 to return to normal out of engagement with the power driven disk 147 by means of the leaf spring 144.

By referring to Fig. 1, it will be noted that nine conductors, designated by the numerals 221 to 229, inclusive, are connected from correspondingly positioned brushes in each of the digital multiplying commutators 108 to digital key contacts in the multiplicand keybank 101. Since the eighth key in the units (U) column of the multiplicand keybank 101 is depressed, the contacts are closed at that point and eight electrical impulses corresponding to the units 8 of the product 48 of six times eight are sent out from grounded battery through conductor 230 through the energizing winding of the units (U) electromagnet 186 of the register 110, conductor 231, terminal 1 of the associated arcuate bank 172, brush 166 of the distributor 109, conductor 237, the contact closure of key 8 in the units (U) strip of the multiplicand keybank 101, conductor 222, brush 233 of the multiplying commutator for the digit 6, through the associated contact disk representing the product 48, brush 234 which is always in contact (an open headed arrow represents a brush which makes contact at all times), through conductors 235 and 236 to ground. The eight electrical impulses thus transmitted operate the ratchet and pawl mechanism 182 of the units (U) register section 178 eight times to rotate its associated indicator 181 and thereby register the units (U) digit 8 of the product 48.

At the same time and in an analogous manner contact disks representing the products 12 of 6×2, 36 of 6×6 and 24 of 6×4 establish and send electrical impulses corresponding in number to the units part of the particular products through contact closures in the tens (T), hundreds (H) and ten hundreds (TH) columns of the multiplicand keybank 101 through corresponding denominational distributing brushes 167, 168 and 169, through the electromagnets 186 of the units (U), tens (T) and ten hundreds (TH) registering sections, respectively. These electrical impulses operate the respective denominational registering mechanisms whereby the tens (T), hundreds (H) and ten hundreds (TH) registering sections indicate the units digits 2, 6 and 4 of the products 12, 36 and 24, respectively.

As has been previously mentioned, the rotation of the digit 6 multiplying commutator was stopped at rotative position 10. At this position the circuit is completed from grounded battery through the winding of electromagnet 165, back contact 238 thereof, right hand contact of an "adding" key 239, conductor 240, conductor 241, brush 242 which is always in contact, through control disk 136 of the digit 6 multiplying commutator, upper right hand brush 246 thereof which makes contact only at rotative position 10, conductor 244, conductor 245, through brush 171 of the distributing switch 109 to ground. The energization of the electromagnet 165 operates it once to advance the denominational distributing brushes 166 to 171, inclusive, from terminals 1 to terminals 2 in the arcuate banks 172 whereby the ground from brush 171 which closed the circuit to operate the electromagnet 165 is opened. The ground instead is now connected through brush 171 to terminal 2, through conductor 247, conductor 248, the upper right hand brush 249 of control disk 137 of the digit 6 multiplying commutator, which brush contacts only at rotative position 10, through control disk 137, brush 250, conductor 251, the winding of electromagnet 146 for the digit 6 multiplying commutator, conductor 217 to battery 218 and ground. Thus, the particular electromagnet 146 is energized to bring the disks 145—147 into engagement and cause rotation of the digit 6 multiplying commutator. As the multiplying commutator moves out of rotative position 10 into position 11, the contact of brush 249 is opened and the energizing circuit for the electromagnet 146 through the digit 6 control disk 135 again becomes effective to cause rotation of the digit 6 multiplying commutator from rotative position 11 to position 20.

During this second half rotation of the digit 6 multiplying commutator, electrical impulses corresponding in number to the value of the tens digits in the products of multiplying each of the denominational digits in the multiplicand

TH HTU
4, 6 2 8 by the digit 6 are sent out over individual conductors in the group of conductors 221 to 229, inclusive, through contact closures in the multiplicand keybank 101 to the distributing brushes 166, 167, 168 and 169, respectively. In this second half cycle, however, the distributing brushes are contacting with terminals 2 in the associated arcuate banks 172 so that each of the brushes are now connected to electromagnets 186 of registering sections of next higher denominational order than they previously were. That is, brush 166 is connected to the tens (T) electromagnet, brush 167 to the hundreds (H), brush 168 to the ten hundreds (TH), and brush 169 to the ten thousands (TT) in the register 110. The tens (T) registering section is thus operated four times to register the tens (T) digit 4 of the product 48 of 6×8, the hundreds (H) registering section one time to register the tens (T) digit 1 of the product 12 of 6×2, the hundreds (H) registering section three times to register the tens (T) digit 3 of the product 36 of 6×6, and the ten thousands (TT) registering section two times to register the tens (T) digit 2 of the product 24 of 6×4.

At rotative position 20, the digit 6 multiplying commutator stops rotating since there is insulation at that point in the associated control disk 135 and the energizing circuit to the electromagnet 146 is opened at brush 215 to thereby deenergize the electromagnet and permit the friction disk 145 to return to normal position out of engagement with the driving disk 147. An energizing circuit is then completed at rotative position 20 for the electromagnet 165 to advance the distributing brushes 166 to 171, inclusive, to terminals 3 of the arcuate banks 172 as follows: from ground through brush 171, terminal 2 of the associated arcuate bank 172, conductor 247, conductor 248, brush 243 of the control disk 136 for the digit 6 multiplying commutator, through the aforesaid disk 136, through brush 242, conductor 241, conductor 240, right hand contact of key 239, back contact 238 of the electromagnet 165, through the winding of electromagnet 165 to battery. Distributing brush 171 now contacts with terminal 3 in the associated arcuate bank 172 to establish a circuit from ground through conductor 260, conductor 245, conductor 244, brush 261, control disk 137 of the digit 6 multiplying commutator, brush 250, conductor 251, the winding of the associated electromagnet 146, conductor 217 to battery and thence to ground to cause rotation of the digit 6 multiplying commutator from rotative position 20 to position 21 where it stops for want of a power circuit, since the brush 261 of the control disk 137 makes contact only at rotative position 20.

Simultaneously with the above action, ground from the distributing brush 170 is continued through associated terminal 3, conductor 264 to the tens (T) strip of keys in the multiplier keybank 102, through the left hand contact of key 1, conductor 265, brush 266, control disk 135 of the digit 1 multiplying commutator, brush 267, through the winding of the associated electromagnet 146 to battery 218 and ground to complete the circuit.

The electromagnet 146 for the digit 1 multiplying commutator is thus energized and effects the engagement of the associated friction disks 145—147 to rotate the digit 1 multiplying commutator. In rotating from positions 1 to 10, the digit 1 multiplying commutator sends out electrical impulses to individual leads in the group of conductors 221 to 229, inclusive, through contact closures in the multiplicand keybank 101 to the distributing brushes 166 to 169, inclusive, and since these brushes contact with terminals 3 in the associated arcuate banks 172, the electrical impulses 8, 2, 6 and 4 corresponding to the products of the multiplicand 4,628 multiplied by the tens (T) digit 1 are directed into the tens (T), hundreds (H), ten hundreds (TH), and ten thousands (TT) electromagnets 186 to advance their indicators 181 the designated number of steps.

When the digit 1 multiplying commutator arrives at rotative position 10, a circuit is completed from ground through distributing brush 171, terminal 3, conductor 260, conductor 245, conductor 270, upper right hand brush 271 of the control disk 136 for the digit 1 multiplying commutator, through said disk 136, through the associated brush 272, conductors 241 and 240, right hand contact of key 239, back contact 238 of the electromagnet 165, through the winding of the electromagnet 165 to battery and ground to thereby energize the electromagnet 165 and advance the distributing switches from terminals 3 to terminals 4 in the arcuate terminal banks 172. At this point, ground from brush 171 is continued through the associated terminal 4, conductor 273, conductor 247, conductor 274, upper right hand brush 275 of the control disk 137 of the digit 1 multiplying commutator, through said disk 137, brush 276, conductor 277, through the winding of electromagnet 146 of the digit 1 multiplying commutator to battery to cause engagement of the disks 145 and 147 and rotation of the digit 1 multiplying commutator from position 10 to rotative position 11.

When rotative position 11 is reached, the circuit is open because brush 275 makes contact only at position 10, but a circuit is then completed from distributing brush 171 through associated terminal 4, conductor 273, conductor 247, conductor 274, through lower right hand brush 278 of the disk 136 of the digit 1 multiplying commutator, through said disk 137, brush 272, conductor 241, conductor 240, right hand contact of key 239, back contact 238 of the electromagnet 165, through the winding of electromagnet 165 to battery. This energization of electromagnet 165 operates it to advance the distributing brushes 166 to 171, inclusive, from terminals 4 to terminals 5. Distributing brush 171 again completes a circuit through its associated terminal 5, conductor 280, conductor 245, conductor 270, lower right hand brush 281 of disk 137 of the digit 1 multiplying commutator, through said disk 137, brush 276, conductor 277, through the winding of electromagnet 146 of the digit 1 multiplying commutator to effect rotation thereof through position 20.

At the same time the distributing brush 170 connects ground to the hundreds (H) key strip in the multiplier keybank 102 through a circuit from distributing brush 170, associated terminal 5 in the arcuate bank 172, and conductor 282. Since the multiplier is

TH HTU
2, 0 1 6 no key is depressed in the hundreds (H) strip and the above circuit is continued through the right hand contact of key 9 of the hundreds (H) strip, through all of the right hand contacts in this hundreds (H) strip of keys through conductor 283, conductor 240, right hand contact of key 239, back contact 238 of electromagnet 165, through the winding of electromagnet 165, to battery and ground. The electromagnet 165 is thus energized and advances brushes 166 to 171, inclusive, from terminals 5 to terminals 6 in the arcuate bank 172, and since the 5 and 6 terminals associated with the brush 170 are connected together, the electromagnet 165 is operated again to advance the distributing brushes into contact with terminal 7.

Distributing brush 170 now continues ground through its associated terminal 7, through conductor 285 to the TH key strip in the multiplier keybank 102. In a manner similar to the one described for the digit 6 multiplying commutator, the digit 2 multiplying commutator advances the ten hundreds (TH), ten thousands (TT), hundred thousands (HT) and millions (M) indicators 181 of the register 110 through 6, 4, 2 and 8 steps, respectively, to register the units digits of the products of multiplying each digit in the multiplicand 4,628 by the ten hundreds (TH) multiplier digit 2; the distributing brushes 166 to 171, inclusive, are then advanced by the electromagnet 165 to terminals 8 in the arcuate banks 172, and from rotative positions 11 to 20, inclusive, the digit 2 multiplying commutator establishes electrical impulses to operate the indicators 181 of the ten thousands (TT), hundred thousands (HT), millions (M) and ten millions (TM) registering sections to register 1, 0, 1 and 0, respectively, as the tens part of the products of multiplying 4,628 by 2. Upon the completion of this cycle, the product 9,330,048 is indicated by the register 110 as shown in Fig. 2.

An outline of the general process by which the product of multiplication was obtained is illustrated by the following diagram:

| TM | M | HT | TT | TH | H | T | U | Denominations | |
|----|---|----|----|----|----|----|----|---|---|
| Each digit represents a group of elec. impulses corresponding in number to the value of the digit. | | | 4<br>2<br>4<br>2<br>4<br>0 | 6<br>0<br>6<br>3<br>6<br>0 | 2<br>1<br>2<br>1<br>2<br>0 | 8<br>6<br>8<br>4<br>8 | Multiplicand<br>Multiplier<br>Units<br>Tens<br>Units<br>Tens | Zero computations omitted by computing system and distributing brushes automatically advanced to registering sections of higher denominational orders. |
| | 8<br>1 | 2<br>0 | 4<br>1 | 6 | | | | Units<br>Tens | |
| | 9, | 3 | 3 | 0, | 0 | 4 | 8 | Product | |

The digit 2 multiplying commutator is now standing at rotative position 20 and the electromagnet 165 for advancing the distributing brushes is energized by a circuit completed from distributing brush 171, through associated terminal 8, conductor 288, conductor 247, conductor 248, lower right hand brush 290 of the control disk 136 of the digit 2 multiplying commutator, through said disk 136, associated brush 291, conductor 241, conductor 240, right hand contact of key 239, back contact 238 of the electromagnet 165, through the winding of the electromagnet 165, to battery and ground. The distributing brush 171 has thus been advanced by the operation of electromagnet 165 to contact with terminal 9 and completes a circuit therefrom through conductor 293, back contact 238 of the electromagnet 165, through the winding of the electromagnet 165, to battery and ground, and since the terminals 9 and 10 are connected together, the electromagnet is energized twice to advance the distributing brushes to terminal 11 where the circuit is discontinued. At the same time brush 170 continues ground through the associated terminals 9 and 10, conductor 294, through the key release electromagnets 104 to battery to thereby operate the electromagnets to release the keys and permit them to return to normal. After the result of a computation is obtained, the register is reset to a zero indication by any suitable means well known to the art.

To perform mathematical addition the adding key 239 is depressed. The depression of this key renders active only the digit one multiplying commutator by opening the right hand contact of the key 239 and thereby discontinuing the circuit to electromagnet 165 for advancing the distributing brushes 166 to 171, inclusive, since this distributing feature is not used for purposes of addition. The first series of numbers to be added is set up only upon the multiplicand keybank 101 by depressing the desired digital keys in the denominational columns. The starting key 209 (Fig. 8) having a release electromagnet 104 and comprising the contacts 210 and 211 is then depressed. The closure of contact 211 establishes a circuit from ground through the left hand contact of adding key 239, conductor 296, contact 211, conductor 255, conductor 277, through the winding of the electromagnet 146 of the digit 1 multiplying commutator to battery and ground. The energized electromagnet 146 attracts the associated friction disk 145 into engagement with the driving disk 147 to effect rotation of the digit 1 multiplying commutator.

In a manner similar to that described for the multiplying process, electrical impulses corresponding in number to the products of multiplying the digits indicated by the multiplicand keybank 101 by the digit 1 are established through the group of conductors 221 to 229, inclusive, through contact closures in the multiplicand keybank 101 to distributing brushes 166 to 169, inclusive. Since the depression of the adding key 239 rendered the advancing means for the distributing brushes inactive they will at all times make contact with terminals 1 in the arcuate banks 172 and the above circuits will thus be continued through the windings of the U, T, H and TH electromagnets 186 to battery to advance their associated denominational indicators 181 a number of times corresponding to the number of electrical impulses received by each of the electromagnets 186. Thus, the number set up on the multiplicand keybank 101 is indicated by the register 110. As the digit 1 multiplying commutator reaches rotative position 10, a power circuit is completed through electromagnets 104 to operate these electromagnets and release the starting key 209 as well as the keys which have been depressed in the multiplicand keybank 101, whereby the energizing circuit for the electromagnet 146 of the digit 1 multiplying commutator is discontinued by the opening of the circuit at contact 211.

The circuit for energizing the release electromagnet 104 is traced from grounded battery, through the winding of release electromagnet 104, conductor 294, conductor 297, upper right hand brush 298 of control disk 138 when in positions 10 and 11, through said control disk, associated brush 300, conductor 296, through left hand contact of key 239 to ground. However, at this point the digit 1 multiplying commutator is caused to rotate to position 11 by an energizing circuit for the electromagnet 146 from battery through the winding of electromagnet 146, conductor 277, brush 299, through control disk 138, lower right hand brush 300, conductor 296, left hand contact of key 239 to ground. At rotative position 11 another power circuit is completed for the electromagnet 146 to effect the rotation of the digit 1 multiplying commutator through position 20. This circuit extends from ground through distributing brush 171, associated terminal 1, conductor 245, conductor 270, lower right hand brush 281 of the control disk 137 for the digit 1 multiplying commutator, brush 276, conductor 277, through the winding of the particular electromagnet 146 to battery and ground. Another number is now set up on the multiplicand keybank 101 and the start key 209 and the adding key 239 depressed, whereby the digit 1 multiplying commutator goes through the above cycle of operations to actuate the register 110 where the numbers are automatically accumulated and the result indicated. The foregoing sequence of operations are repeated until any desired series of numbers are added.

What is claimed is:

1. In an electrical computing system, a plurality of sets of contacts for setting up and storing two multi-digit factors of a problem, a source of electrical energy, and cyclically operable means controlled by the setting up contacts for establishing electrical impulses corresponding in number to the value of each of the digits entering into the result of a computation.

2. In an electrical computing system, means for setting up a multiplicand and a multiplier, a source of electrical energy, and a multiplying means including a plurality of independently operable computing means for transmitting electrical impulses corresponding in number to the value of each of the digits in the product of multiplying the entered multiplicand by the multiplier.

3. In an electrical computing system, electrical contact making means for setting up all factors of a mathematical problem, a calculating means comprising a plurality of separately operable devices for creating electrical impulses, an accumulator, a distributing means for directing the electrical impulses into the proper denominational orders of the accumulator, and means controlled by one of the factor setting up means for selectively operating the calculating devices to send out electrical impulses corresponding in number to the value of the denominational digits in computing the entered factors.

4. In an electrical computing system, means for setting up a mathematical problem, an accumulator, a calculating means, circuits interconnecting the setting up means and calculating means, means for actuating the calculating means through computing cycles to cause the accumulator to indicate the result of the mathematical problem, and means for eliminating the computing cycles for zero computations in the computing process.

5. In an electrical computing system, means for setting up a multiplicand and a multiplier, a multiplying means, circuits interconnecting the setting up means and the multiplying means, means for actuating the multiplying means through a cycle for each number in the multiplier to establish impulses to obtain the product, and means for omitting the actuating cycle for a cipher in the multiplier.

6. In an electrical computing system, means for setting up a multiplicand, means for setting up a multiplier, a multiplying commutator for each of the digits of a notation having multiplication table characteristics, a control means for each of the multiplying commutators, a source of electrical energy, a denominational distributing means, means for accumulating the product of multiplication, and means including said control means and controlled by the multiplier setting means for selectively actuating the multiplying commutators to send out electrical impulses through the distributing means to the accumulating means.

7. In an electrical computing system, a source of electrical energy, a device for successively setting up numbers to be added, means controlled by the setting means for establishing electrical impulses corresponding in number to the value of the digits indicated by the setting device, means for receiving said impulses to indicate the result of the addition, and electrical means for automatically returning the setting device and the means for establishing electrical impulses to normal.

8. In a cyclically operable electrical computing system, a source of electrical energy, plural means for setting up multi-digit factors of a problem, multiplying means for each of the digits of a notation, means controlled by one of the factor setting up means for selectively and individually actuating the digital multiplying means in successive cycles to accomplish multiplication, and manipulative means for rendering active only the multiplying means for the digit 1 to perform addition when amounts are entered in one of the setting up means.

9. In an electrical computing system, means for setting up a multiplicand, means for setting up a multiplier, and means controlled by the multiplier and multiplicand setting means for effecting a computation comprising a plurality of selectively rotatable multiplying commutators each of which upon rotation closes contacts representative of the products of all digits by the multiplier digit which it represents.

10. In a computing system, a multiplier setting means, a multiplicand setting means, an accumulator, and means for actuating said accumulator comprising a plurality of rotatable means individually rotatable in accordance with the digits set up in the multiplier setting means for establishing circuits representing the products of all digits by the multiplier digits, and means responsive in accordance with the multiplicand setting means for selecting predetermined ones of the circuits for completion to actuate the accumulator.

11. In an electrical computing system, contacts for storing a plurality of multi-digit factors of a problem, an electrically controlled accumulator having elements arranged in denominational orders, and a plurality of selectively operable computing means controlled by the factor storing contacts for sending a number of electrical impulses to each of said elements corresponding to the value of the digits of a computation to be entered in said elements.

12. In an electrical computing machine, a plurality of independently operable electrical switching members each representing a multiplication table for one of the digits 1 to 9 inclusive and movable through the same cycle when operated, a multiplier storing means, means for selectively rendering predetermined switching members operative as controlled by the digits stored in the multiplier storing means, a multiplicand storing means adapted to cooperate with the switching members for producing a product, and accumulating means for receiving said product.

13. In an electrical computing system, accumulating means, means for actuating the accumulating means, a plurality of separately operable groups of electrical contacting members for controlling said actuating means, the different groups representing computing tables for the digits 1 to 9 inclusive, means for individually operating each group of contacting members, and means for storing the factors of a problem and for controlling the operation of various predetermined groups of the contact members in continuous automatic succession.

14. In an electrical computing system, a plurality of devices separately movable and comprising multiplication tables for each of the digits, means operable to store the factors of a problem, accumulating means, and electrically controlled means for successively conditioning in one continuous operation predetermined groups of the digits in the factors to render predetermined multiplying devices effective under the control of the factor storing means to successively establish circuits through the actuated multiplying devices and the factor storing means to the accumulating means to indicate the product of the factors.

15. In an electrical computing system, means for storing a multiplicand and a multi-digit multiplier of a problem, multiplying means for each of the multiplier digits including a plurality of groups of contacts representing the units and tens parts of the products of multiplication tables, means for cyclically actuating the groups of contacts, selectively and individually in a continuous operation to establish electrical impulses representing the units and tens digits of the partial products, all digits in the multiplicand being multiplied by one digit of the multiplier in each cycle, means for distributing the electrical impulses into the proper denominational orders, and means for receiving the impulses from the distributing means to accumulate the product of the multiplication problem.

16. In an electrical computing system, a multiplying means individual to each significant digit of a notation for establishing circuits representing the products of all digits of said notation by the digit which it represents, setting means for storing a multiplier in a plurality of denominational orders, setting means for storing a multiplicand in a plurality of denominational orders and for controlling the completion of circuits by the multiplying means, a denominational distributing means, accumulating means, and means for automatically selecting a multiplying means for actuation one at a time in succession as controlled the multiplier setting means to complete circuits through the multiplicand setting means through the distributing means to the accumulating means to effect the accumulation of the result of a computation in the proper denominational orders.

17. In a computing machine, means for setting up the factors of a computation, means for detecting the number of significant digits in one of the factors of the computation and their denominational value, means for performing a plurality of computing cycles to effect a computation of the factors set up, and means for determining the number of computing cycles in accordance with the detection of the number of significant digits, and independent of the numerical value of said significant digits.

18. In a computing system, contact making means for storing the factors of a computation, a calculating means, electrical means for detecting the number of significant digits in one of the factors, and means for controlling the actuation of the calculating means according to the number of significant digits detected.

19. In a computing system, means for storing the factors of a computation, a calculating means comprising individually actuated computing devices, means for detecting the number of significant digits in one of the factors, and means for actuating one of the computing devices for each significant digit detected.

20. In a computing system, means for storing the factors of a computation, a calculating means comprising individually actuated computing devices, means for detecting the number of significant digits in one of the factors, means for actuating one of the computing devices for each significant digit detected, the number of computing devices actuated depending upon the number of different significant digits, and the computing devices actuated depending upon the value of significant digits.

21. A computing machine having in combination, means for detecting the numbers of significant digits in one of the factors of a computation and their denominational value, and means for controlling the computing cycle of the machine in accordance with the detection of such number of digits only and irrespective of their numerical value.

22. A controller for a computing machine having receiving devices into which results are entered, and including in combination significant digit detecting devices with provisions for detecting the number of significant digits and also determining their denominational value, but for disregarding their numerical value, and means controlled by said detecting devices for controlling the denominational order of entry of the results into the receiving devices.

23. A cycle controller for a multiplying machine including significant digit detecting devices, means controlled thereby for determining the number of computing cycles of the machine and initiating one computing and entering cycle only for each significant digit, and means also controlled by the detecting devices for evaluating the denominational orders of the computations.

24. A calculating machine controller with means for controlling the operation of the machine in accordance with the numbers of the significant digits in one factor of a problem and independently and irrespective of the numerical value of the digits, significant digit detecting means, and means for controlling the former means by the latter.

25. A controller for a computing machine including devices for detecting the significant figures of one of the factors of a computation, means controlled thereby for successively effecting computations by each of the significant figures only, said means including provisions for effecting one complete computing and accumulating cycle only for each significant figure irrespective of the numerical value of the significant figure.

26. A cycle controller for a power operated automatic multiplying machine with entry means for one factor and wherein devices are provided for reading in another of the factors of a to be performed computation, means associated with said reading in means for ascertaining the column or columns wherein zeros appear and the column or columns in which significant digits appear, means under the control of the last mentioned means for causing the machine to only effect partial product multiplications upon columns where significant digits appear and to omit idle machine cycles upon columns where zeros appear for correspondingly evaluating the relative denominational order of partial product entries so computed in accordance with the denominate value of each significant digit.

27. In a multiplying machine, an accumulator having plural denominational orders, a plurality of members with means for shifting them at predetermined times for routing entry of digits of a calculation into the proper denominational orders as the calculation progresses, electrical contact means for setting up a multiplier factor, and means comprising electrical circuits controlled by said contact means for operating the shifting means to effect a shift of said members as determined by said contact means.

28. In a multiplying machine, denominational distributing members with means for shifting them at predetermined times as a multiplication progresses, electrical contact means for entering a multiplier factor of a multiplication to be performed, and means including electrical circuits controlled by said factor entering contacts for operating the shifting means to effect a column shift of said members.

29. A multiplying machine with multiplying devices including partial product receiving means, multiplier factor entry receiving means, and a cycle controller for the multiplying means to control the number of partial product computing cycles and evaluate denominationally such cycles and selectively control the entry of partial products into the partial product receiving means, said cycle controller comprising means cooperating with the multiplier factor entry receiving means to detect and distinguish between the presence of significant digits or zeros in columns of the multiplier and means controlled thereby to omit computing cycles in columns where zeros appear and to effect proper denominational order entry of partial products for the computing cycles for columns where significant digits appear.

30. An accounting machine with multiplying devices for effecting multiplying operations and including an electrically controlled cycle controller for controlling the number of computing cycles and eliminating cycles where zeros appear in denominational orders of the multiplier and means for controlling the operation of the cycle controller, said means comprising a multiplier entry receiving device having an electrical contact making means associated therewith for detecting the presence of zeros in denominational orders of the multiplier after the multiplier entry is made into the multiplier entry receiving device.

31. In a calculating machine adapted to perform a succession of calculating cycles in computing a single problem, a plurality of separately operable electrical contact making multiplying devices, said devices being also individually and independently operable, factor entry receiving and retaining means, a cycle controller to eliminate calculating cycles by avoiding operation of the multiplying devices for denominational orders of the multiplier where zeros occur, and means for controlling the said cycle controller comprising means responsive to the condition of the set up of the factor entry receiving means for one factor completely entered to determine the presence or absence and location of zeros in various denominational orders.

32. In a calculating machine, independently operable multiplying means one for each digit of a notation, a cycle controller, one factor entry receiving and retaining means, a second factor entry receiving and retaining means, and means for detecting the presence of significant digits in the denominational orders of one of the factor entry receiving and retaining means after completion of the entry therein and for controlling the individual operation of the independently operable multiplying means through the cycle controller to omit a computing cycle when a zero occurs in the factor set up in the said one of the factor entry receiving and retaining means.

33. In a calculating machine having multiplying devices, the machine being adapted to perform a succession of calculating cycles in computing a single problem, a factor entry receiving and retaining means, a cycle controller to eliminate unwanted and unnecessary calculating cycles and to initiate calculating cycles equal in number to significant figures in the entered factor, means for controlling the said cycle controller comprising sensing means to sense the retained set up of the factor entry receiving means for one factor to determine the presence or absence and location of zeros in denominational orders, and column shifting means controlled by the cycle controller in accordance with the denominational value of the significant figures of the entered factor.

34. In a calculating machine having multiplying devices, the machine being adapted to perform a succession of calculating cycles in computing a single problem, multiplier and multiplicand factor entry receiving means, a cycle controller to eliminate unwanted and unnecessary calculating cycles, means for controlling the said cycle controller comprising reading means to read the retained setup of the factor entry receiving means for one factor to determine the presence or absence and location of zeros in various denominational orders, and means for causing said receiving means to retain the entered factors until the final product is obtained by the multiplying devices.

35. An accounting machine with multiplying devices for effecting multiplying operations and including a cycle controller for controlling the number of computing cycles and eliminating unwanted and unnecessary cycles where zeros appear in columns of the multiplier, and means for controlling the operation of the cycle controller, said means comprising multiplier entry receiving contacts and electrical circuits associated therewith for detecting the presence of zeros in any columns of the multiplier after the multiplier entry is made into the multiplier entry receiving device.

36. A cyclically operable electrical multiplying machine including electrical means for entering and setting up multiplier and multiplicand factors to be multiplied, a cycle controller, electrically controlled means effective after completion of the entry of the multiplier factor to detect the presence of zeros therein and to accordingly control the cycling multiplying operation of the machine through the cycle controller in accordance with the zeros which are detected.

37. A cyclically operable calculating machine with multiplicand setup devices, devices for setting up and retaining for a complete computation of multiplier factor, a plurality of multiplying devices electrically connected to the multiplicand and the multiplier set up devices, a plurality of multiplication control electrical means, accumulating means, means for determining the presence of zeros in the multiplier setup and retaining devices after completion of the entry to eliminate unnecessary computing cycles where zeros occur in the entered multiplier factor, and means for actuating the machine to establish circuit relations between the multiplicand setup devices, the multiplier setup devices, the determining means and the multiplication control means to transmit timed impulses to the accumulating means to indicate the result of the multiplication.

38. In a calculating machine adapted to perform a succession of calculating cycles equal to the number of significant digits in the multiplier factor, a plurality of separately operable multiplying devices, means for receiving and retaining the factors until after the indication of the final product, a cycle controller to eliminate unwanted and unnecessary calculating cycles by avoiding operation of the multiplying devices, and means for controlling the said cycle controller comprising means responsive to the condition of the setup of the factor entry receiving means for the multiplier factor completely entered to determine the presence or absence and location of zeros in the various denominational orders.

39. In a calculating machine adapted to perform a succession of calculating cycles in computing a single problem, a plurality of separately operable electrical multiplying devices, electrical means for receiving and retaining factors to be multiplied, a cycle controller to eliminate unwanted and unnecessary calculating cycles by avoiding operation of the electrical multiplying devices, and means for controlling the said cycle controller comprising means responsive to the condition of the setup of the factor entry receiving means for one factor completely entered to determine the presence or absence and location of zeros in various denominational orders.

40. In a calculating machine adapted to perform a succession of calculating cycles in computing a single problem, a plurality of separately operable multiplying devices for performing partial product multiplication, one for each significant digit of the multiplier, multiplier and multiplicand factor entry receiving means for retaining the factors until completion of the computation, means for automatically omitting computing operations where zeros occur in the multiplier factor and means for controlling the said automatic means including means responsive to the condition of the setup of the factor entry receiving means for one factor completely entered to determine the presence or absence and location of zeros in various denominational orders.

41. In an electrical multiplying machine, electrical means for storing a multi-denominational multiplicand factor, electrical means for storing a multi-denominational multiplier factor, a plurality of sets of contacts representative of the digits 1 to 9 inclusive, an accumulator, a denominational distributing means electrically connected to the accumulator, multiplying control devices selectively called into action under control of the multiplier factor storing means for controlling the establishment of circuits through the said sets of contacts to transmit electrical impulses through the distributing means to the accumulator to indicate the product, and a cycle controller controlled by the setup of the multiplier factor storing means for eliminating unwanted and unnecessary multiplying cycles where zeros occur, said cycle controller also controlling the operation of the denominational distributing means.

42. In an electrical multiplying machine, means for storing a multi-digit multiplicand, means for storing a multi-digit multiplier, accumulating means, a denominational distributing means for the accumulating means, multiplying means including a plurality of independently operable sets of contacts, a plurality of multiplication control relays for selectively controlling the closure of certain sets of said contacts, means for rendering the multiplier storing means effective to control the operation of the multiplication control relays in succession in accordance with the values of the digits stored and for eliminating unwanted and unnecessary multiplying cycles where zeros occur in the multiplier, said means also controlling the denominational distributing means to transmit impulses from the said sets of contacts through the distributing means into the proper denominational columns in the accumulating means to indicate the result.

43. In a calculating machine, separately operable multiplying means for each of the digits, a cycle controller, a multiplier entry means for retaining a multiplier factor for a plurality of digital computations, a multiplicand entry and retaining means, and means for detecting the presence of zeros in the multiplier entry and retaining means after completion of the entry therein and for controlling the individual operation of the separately operable multiplying means through the cycle controller to omit a computing cycle when a zero occurs in the entered multiplier factor.

44. In a cyclically operable electrical computing system, means for setting up multi-digit factors of a problem, a source of electrical energy, a plurality of independent computing means, each for multiplying all digits of one factor by a digit of the other factor in a cycle of operation, and means operable after all the digits of the factors have been set up for actuating the computing means selectively and successively in accordance with the digits of said other factor to establish electrical impulses to effect entries of subproducts of the result of the computation.

45. In a cyclically operable computing machine, multiplier and multiplicand setting means for setting up multi-digit factors, a multiplying means comprised of a plurality of contact making devices one for each significant digit of a notation, any of which devices may be actuated selectively under control of the multiplier setting means and in its actuation in a cycle establishes contacts representing the products of all digits of the multiplication table by the digit which it represents, and means for causing selective operation of said devices in successive cycles of machine operation.

46. In an electrical computing system, means for storing plural factors of a problem in denominational columns, a plurality of electrical computing means, means for operating said computing means selectively and in successive cycles to compute intermediate results involving all digits of one factor and a single digit of the other factor in each cycle, means for accumulating a final result of a computation, and means controlled by one of the factor storing means for determining the operation of the computing means selectively and individually to complete electrical circuits through the other factor storing means to the accumulating means.

HAROLD GLENN JOHNSTONE.
CHARLES WILLIAM ROBBINS.